(12) United States Patent
Oron et al.

(10) Patent No.: US 7,489,692 B1  
(45) Date of Patent: Feb. 10, 2009

(54) METHOD AND SYSTEM FOR ATM VIRTUAL CIRCUIT NUMBERING

(75) Inventors: Moshe Oron, San Rafael, CA (US); Paul Warner, Hollywood, FL (US); Shimon Hochbaum, Santa Rosa, CA (US)

(73) Assignee: Tellabs Petaluma, Inc., Petaluma, CA (US)

( * ) Notice: Subject to any disclaimer, the term of this patent is extended or adjusted under 35 U.S.C. 154(b) by 830 days.

(21) Appl. No.: 10/767,218

(22) Filed: Jan. 28, 2004

(51) Int. Cl. *H04L 12/26* (2006.01)

(52) U.S. Cl. .................................. 370/395.43; 370/409

(58) Field of Classification Search .................. 370/397, 370/399, 395.43, 409

See application file for complete search history.

(56) References Cited

U.S. PATENT DOCUMENTS 5,912,892 A * 6/1999 Barnhart et al. ............. 370/397  
2005/0008372 A1 * 1/2005 Hochbaum .................. 398/140

* cited by examiner

*Primary Examiner*—Melvin Marcelo  
(74) *Attorney, Agent, or Firm*—Hamilton, Brook, Smith & Reynolds, P.C.

(57) ABSTRACT

A system and method for providing identifying numbers for virtual circuits and virtual paths in a network is described. The system and method make use of a predetermined group of identifying numbers such that each number corresponds to a particular communication type and port.

21 Claims, 4 Drawing Sheets

| Port Type | Port # | per port VCC # | Formula | VCI Value |
|---|---|---|---|---|
| Data ports Ethernet / DSL | 1-24 | 1st | 31 + Port # | 32-55 |
| | 1-24 | 2nd | 55 + Port # | 56-79 |
| | 1-24 | 3rd | 79 + Port # | 80-103 |
| | 1-24 | 4th | 103 + Port # | 104-127 |
| | 1-24 | 5th | 127 + Port # | 128-151 |
| | 1-24 | 6th | 151 + Port # | 152-175 |
| | 1-24 | 7th | 175 + Port # | 176-199 |
| | 1-24 | 8th | 199 + Port # | 200-223 |
| Voice | Single VCC | 1 | 1 | 256 | 256 |
| | Per port VCC | 1-32 | 1 | 255 + Port # | 256-287 |
| T1 | | 1-8 | 1 | 311 + Port # | 312-319 |
| Control port (OMCI) | | 1 | 1 | 512 | 512 |

Fig. 2

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Unused | | | | | Port type | | | Port / VCC instance | | | | | | | |

| | | |
|---|---|---|
| 0 | 0 | 0 |
| 0 | 0 | 1 |
| 0 | 1 | 0 |
| 1 | 0 | 0 |

0 Data Ports: Ethernet / DSL
1 TDM ports: Voice / T1 / DS3
2 OAM "ports": OMCI / Diagnostics
4 Future ports

Fig. 3

| Port Type | | Port # | per port VCC # | Formula | VCI Value |
|---|---|---|---|---|---|
| Data ports Ethernet / DSL | | 1-24 | 1st | 31 + Port # | 32-55 |
| | | 1-24 | 2nd | 55 + Port # | 56-79 |
| | | 1-24 | 3rd | 79 + Port # | 80-103 |
| | | 1-24 | 4th | 103 + Port # | 104-127 |
| | | 1-24 | 5th | 127 + Port # | 128-151 |
| | | 1-24 | 6th | 151 + Port # | 152-175 |
| | | 1-24 | 7th | 175 + Port # | 176-199 |
| | | 1-24 | 8th | 199 + Port # | 200-223 |
| Voice | Single VCC | 1 | 1 | 256 | 256 |
| | Per port VCC | 1-32 | 1 | 255 + Port # | 256-287 |
| | T1 | 1-8 | 1 | 311 + Port # | 312-319 |
| Control port (OMCI) | | 1 | 1 | 512 | 512 |

METHOD AND SYSTEM FOR ATM VIRTUAL CIRCUIT NUMBERING

BACKGROUND OF THE INVENTION

1. Field of the Invention

The present invention relates generally to the field of optical networking.

2. Description of the Related Art

In order to serve the increasing bandwidth requirements demanded by modern communication applications, high-speed communications networks have been developed. The advent of certain technological advances, the movement from centralized systems to distributed computing, and worldwide standardization efforts, among other things, have led to the availability of high performance digital communications networks.

One such network is defined by a group of standards referred to as Asynchronous Transfer Mode (ATM). ATM technology and protocols allow for the integrated transmission of voice, data and video traffic simultaneously over high bandwidth circuits at speeds from T1 to OC-48 (2.5 Gbps). Communication using ATM is accomplished through the switching and routing of packets of data referred to as cells, and a cell is a fixed-size packet of data. ATM networks are often used to provide high speed Internet access.

One particular type of ATM network makes use of optical waveguides in place of electrical conductors to carry the signals. Though most optical networks switch to electrical conductor transmission at the termination points, it would be beneficial from both a speed and a bandwidth perspective to provide entirely optical networks. While optical networks have become common in long-haul and metro area networking, they have not yet fully penetrated the local access portion of the network architecture. A particular example of a more local network is the PON (Passive Optical Networking) network. In this regard, the industry is working on the problems of providing so-called fiber to the premises (FTTP) networks. FTTP networks, and in particular, point to multipoint FTTP networks are generally quite complex and the standards governing them require a number of addressing rules to be applied by service providers that install and maintain them. Thus, the inventors have determined that an automated system of handling numbering for ATM interfaces can find use in current and upcoming generations of optical networks.

SUMMARY

Embodiments may include a method that includes determining a communication port number corresponding to a particular communication port, determining a communication type corresponding to the communication port and selecting an identifying number that corresponds to the port and type. The identifying number includes particular bits that correspond to the port and other bits that correspond to the type.

Additional embodiments adhere to numbering rules set forth in standards governing ATM networks. Further additional embodiments make use of a system in which a group of low bits correspond to the port and a group of high bits correspond to the type.

Embodiments may also include a system that includes an communication network having a plurality of communication ports and allowing for a plurality of communication types, a network controller, functionally associated with the network, that makes use of identifying numbers associated with the plurality of communication ports and the plurality of communication types, and a processor, configured and arranged to select an identifying number for at least one of the plurality of communication ports or at least one of the plurality of communication types.

Furthermore, embodiments may include a machine readable medium encoded with machine executable instructions for performing a method including determining a communication port number corresponding to a particular communication port, determining a communication type corresponding to the communication port and selecting an identifying number that corresponds to the port and type.

BRIEF DESCRIPTION OF THE DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 shows a table summarizing an example of a numbering scheme;

FIG. 3 shows a table illustrating an example of another numbering scheme; and

FIG. 4 shows a table illustrating an example of a further numbering scheme.

DETAILED DESCRIPTION

Figure 1:
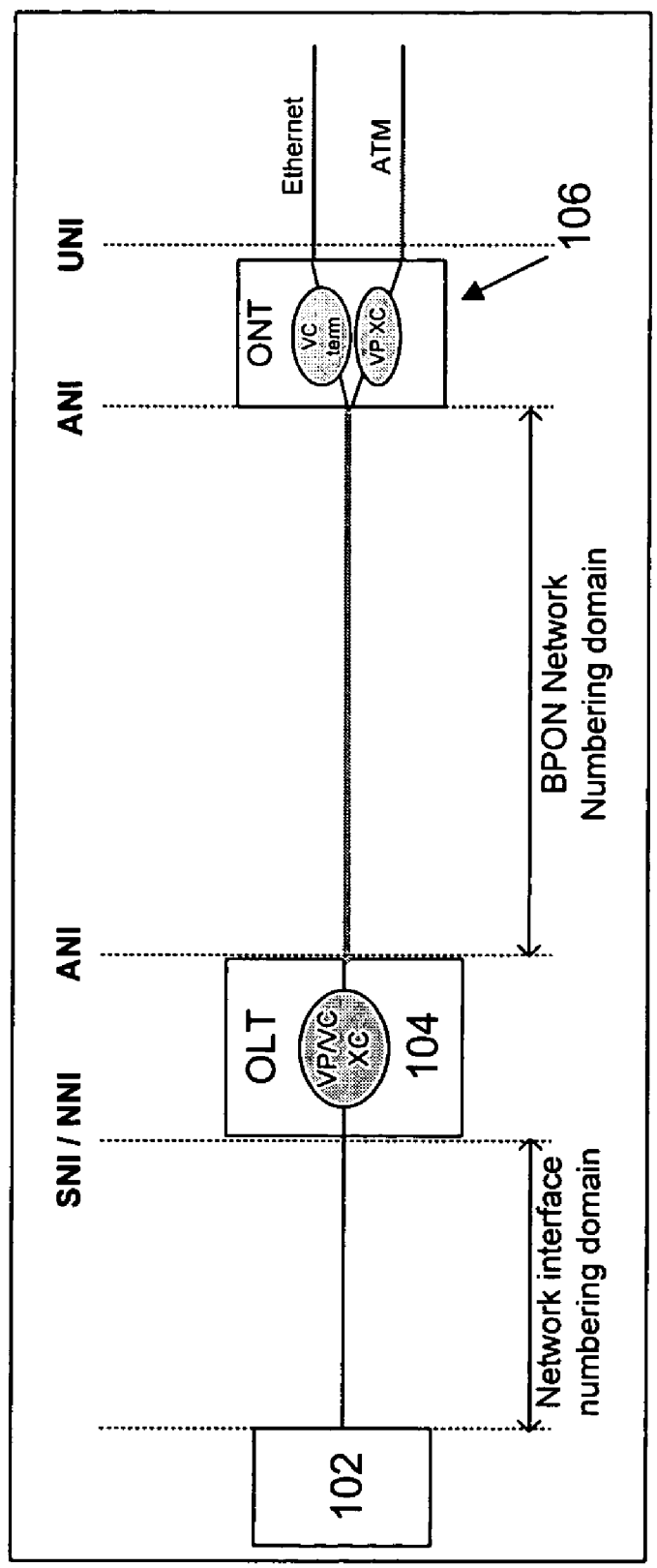
FIG. 1 is a block diagram of an example of a generalized PON network.

An embodiment of the present invention includes a system and method for providing network addressing using predetermined rule sets for use with a communications service. It may find particular application in optical networks, and in particular, point to multipoint networks including PONs, broadband PONs (BPONs) and gigabit PONs (GPONs).

In at least one embodiment, one such communications service may be an ATM based network that provides data services such as Internet Access to multiple subscribers.

Service providers may provide differentiated communications services to their users by providing ATM services in accordance with a particular ATM service category for different applications. For example, high speed Internet access may be provided in accordance with the Unspecified Bit Rate ("UBR") ATM service category. The UBR service category is intended for non-real-time applications (i.e., applications that can tolerate relatively high variations in cell transfer delay) and does not guarantee any particular CLR or CTD for the ATM service. Other types of service include continuous bit rate (CBR) service, non-real time variable bit rate (nrt-VBR) and real time variable bit rate (rt-VBR) service. The various service categories discussed herein may also be referred to as service types and other service types are contemplated as being within the scope of the invention.

FIG. 1 shows a block diagram of an example of a PON network. A network interface separates the BPON network from a portion of a higher level network 102. The network interface may include, for example, an optical line termination (OLT) 104. The OLT may include, for example, hardware and/or software for providing virtual path, virtual circuit and cross connect functions. The OLT is further in communication with one or more optical network terminations (ONT) 106 or optical network units (ONU). As may be understood, the generic term "network termination" can be used in place of ONT, and the present invention is not restricted to use within an optical network, but may find an application in other types of network. The ONTs and/or ONUs each may include hardware and/or software for providing virtual circuit termination and virtual path cross connect functions, and may further include adaptation functions for interfacing with various other types of network interfaces such as Ethernet, for example. The network space between the OLT and ONTs can be referred to as the BPON network. Within the BPON network a system for numbering the virtual connections and virtual paths is used, thus the BPON numbering domain essentially includes that network space between the OLT and ONTs (or ONUs).

In at least one embodiment, the network is configured to provide communications in accordance with cell-switched communication standards and protocols such as, for example, ATM standards and protocols. In an embodiment, the network may provide Internet Protocol (IP)-based communications to support applications such as, but not limited to, Internet access. In particular, the network may be configured to provide IP over ATM using ATM Switched Virtual Connection (SVC) in accordance with Internet Engineering Task Force (IETF) Request for Comment (RFC) 1577, for example.

Embodiments of the present invention generally find an application within the BPON numbering domain. In order to automate the process of assigning identifying numbers to either or both of virtual circuits and virtual paths within the BPON network, embodiments of the present invention provide a method of selecting numbers from a preset group.

Within the preset group, each number can be said to correspond to both a particular type of communication and a particular port. In the context of virtual path identifying numbers, each identifying number includes a portion that corresponds to a particular port identification and another portion that corresponds to a particular type of service.

For example, in the context of VPIs, each port identification may correspond to a particular ONT within the network. In general, a single OLT may serve several ONTs, for example, up to 64 ONTs may be served by one OLT. In this case, six bits would be required to specify uniquely the port identification.

Each type of service identification may correspond to a particular type of service. For example, four possible types of service are UBR, CBR, nrt-VBR and rt-VBR. If only four types of service are required, then two further bits can define the type of service. However, it may be useful to employ three or more bits to define the type of service in order to allow for future developments and other services. The ATM standard allows for up to 12 bits total for defining VPIs and up to 16 bits for VCIs. As a result, in the above-described system for defining VPIs, there are at least three bits left unused. These extra bits could be used to provide additional information, or may be reserved for use with various future developments. The table shown in FIG. 2 summarizes an example of a numbering scheme in accordance with the above discussion.

Figure 2:
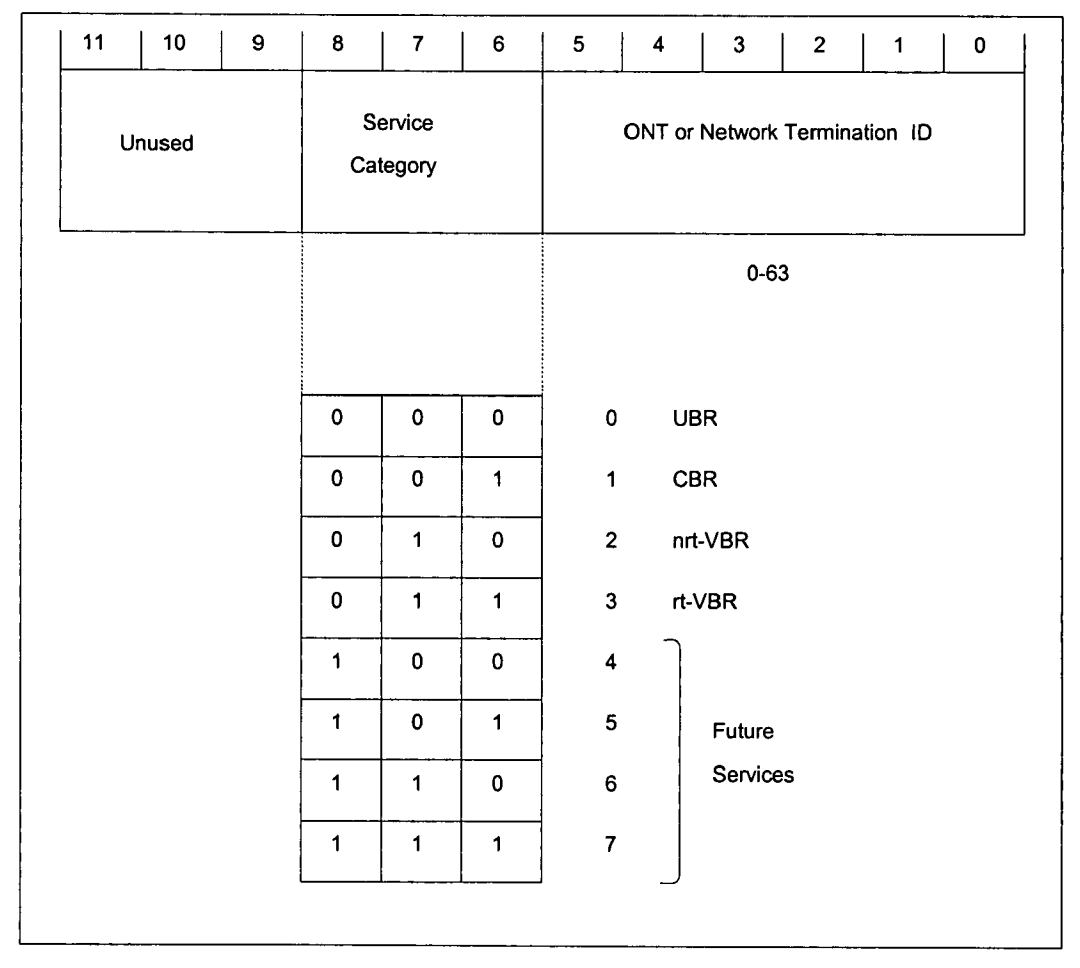

As is clear from FIG. 2, up to 64 ONTs may be individually identified using the low six bits of the identification number. Further, three higher bits are used to define the category, or type, of communication. Type 0 corresponds to UBR, type 1 to CBR, type 2 to nrt-VBR and type 3 to rt-VBR.

The top three bits remain unused. If, for example, a single OLT were to communicate with more than 64 ONTs, more bits could be used on the low end to identify the ONTs, making use of some of the reserved bits. Likewise, if the number of types of services were to increase beyond 8, some of the reserved bits could be used to define those services. Another possibility for future use of the unused bits is a broadcast VPI that communicates with each of the ONTs. In general, such a broadcast VPI should be a non-churned VP.

By way of example, ONT #3, carrying nrt-VBR communication would be assigned identifying number 131. That is, because the type is voice CBR, the seventh bit is 1, corresponding to 128. The low bits are 000011, corresponding to 3, the number of the ONT. Thus, the VPI number is 131, which is simply 128 plus 3. As will be evident from the table in FIG. 2, for UBR type services the VPI number is always equal to the ONT number, as the high bits for UBR service are all zero.

Further examples are as follows: For ONT #15, UBR service, the VPI is 15; for ONT #10, CBR service: VPI=74; For ONT #1, CBR: VPI=65.

The table in FIG. 3 illustrates an example of another numbering scheme to be used for assigning numbers to VCIs. According to this table, the low bits encode the port number while the high bits encode the port type.

In the case of an ATM network, the ATM standard excludes the use of port numbers 0-32 for defining a VCI. As a result, the application of the table in FIG. 3 when applying that rule must make certain allowances and therefore results in some slightly different results than would the application of the table in FIG. 2. One such scheme is detailed in the table shown in FIG. 4.

Though the table of FIG. 4 provides specific examples of the number of ports for each type, such examples are not meant to be limiting. As may be seen, the table of FIG. 4 describes a situation in which multiple VCCs are provided for the data ports, but certain other functions receive only a single VCC assignment. For example, even though in the table of FIG. 4 particular channels are assigned fewer VCCs than others, they could instead be provided with the ability to make use of more, or indeed fewer VCCs. Additional types of circuits may be included, for example, specialized, proprietary data port types, video, additional types of voice circuits, diagnostic circuits, and the like.

As a further example, if data ports extended up to 32, rather than 24, as shown in the table of FIG. 4, the table would change only slightly and would simply make use of the numbers between 223 and 255 by changing the formulae in the fourth column. Likewise, any of the available numbers could be split differently from those splits shown in the table of FIG. 4. Furthermore, the unused bits allow for a far greater number of total VCIs and therefore ports than are shown in the table.

In order to further clarify the exemplary scheme illustrated in, some further examples are provided in which ordered pairs of the form {X,Y} are determined. Specifically, in each of the examples, X corresponds to a VPI number, while Y corresponds to a VCI number:

| | |
|---|---|
| ONT #6, UBR service to Ethernet port, on 1st VCC | {6, 37} |
| ONT #6, UBR service to Ethernet port, on 2nd VCC | {6, 61} |
| ONT #6, CBR service to Ethernet port, on 1st VCC | {70, 37} |
| ONT #6, Single voice Circuit | {70, 256} |
| ONT #2, OMCI CBR circuit | {66, 512} |
| ONT #10, UBR circuit to 3rd Ethernet port, on 1st VCC | {10, 34} |
| ONT #10, UBR circuit to 4th Ethernet port, on 1st VCC | {10, 35} |
| ONT #8, T1 port #2 over CBR | {72, 313} |

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

In particular, reference is made herein to ATM networks and to particular terms associated therewith. Nonetheless, the present invention may find use in other types of networks in which numbering schemes to identify particular paths or circuits may be employed.

We claim:

1. A method of determining a communication identifier for use in a communication network having a predetermined communication protocol comprising:
   determining a communication port number corresponding to a particular communication port;
   determining a communication type corresponding to the communications port; and
   selecting an identifying number for use as the communication identifier that corresponds to the communication port number and to the communication type, the identifying number being selected from a preset group of identifying numbers in which particular bits of each identifying number correspond to a group of preselected communication ports and further particular bits of each identifying number correspond to a group of preselected communication types.

2. A method according to claim 1 wherein a group of low bits correspond to a group of preselected communication ports and a group of high bits correspond to a group of preselected communication types.

3. A method according to claim 1 wherein the communication network is an ATM network.

4. The method of claim 3, wherein six low bits correspond to the group of preselected communication ports and three higher bits correspond to the group of preselected communication types.

5. The method of claim 3, wherein the identifying number is a number identifying a virtual path interface.

6. The method of claim 5, wherein the group of preselected communication ports corresponds to a plurality of optical network terminations or optical network units.

7. The method of claim 6, wherein the group of communication types comprises types selected from the group consisting of UBR, CBR, voice CBR and rt-VBR.

8. The method of claim 3, wherein the identifying number is a number identifying a virtual circuit interface.

9. The method of claim 3, wherein eight low bits correspond to the group of preselected communication ports and three higher bits correspond to the group of preselected communication types.

10. The method of claim 8, wherein the group of preselected communication ports corresponds to a plurality of optical network terminations, optical network units or virtual circuit connections.

11. The method of claim 10, wherein the group of communication types comprises types selected from the group consisting of data ports, TDM ports and OAM ports.

12. The method of claim 10, wherein a group of bits are left unused in accordance with the predetermined communication protocol.

13. The method of claim 12, wherein the group of bits left unused comprise bits corresponding to values of 0-31 in accordance with the ATM communication protocol.

14. The method of claim 1, wherein the communication identifier comprises an ordered pair corresponding to both a virtual circuit connection and an optical network termination.

15. The method of claim 14 wherein one member of the ordered pair comprises a number in which six low bits correspond to the group of preselected communication ports and three higher bits correspond to the group of preselected communication types and the other member of the ordered pair comprises a number in which eight low bits correspond to another group of preselected communication ports and three higher bits correspond to another group of preselected communication types.

16. The method of claim 15 in which the one member of the ordered pair comprises a first member of the ordered pair and corresponds to a virtual path identifier and the another member of the ordered pair comprises a second member of the ordered pair and corresponds to a virtual circuit identifier in accordance with the ATM protocol.

17. The method of claim 1, wherein the identifying number is selected by reference to a look-up table.

18. An optical communications system comprising:
   a communication network having a plurality of communication ports and allowing for a plurality of communication types;
   a network controller, functionally associated with the network, that makes use of identifying numbers associated with the plurality of communication ports and the plurality of communication types; and
   a processor, configured and arranged to select an identifying number for at least one of the plurality of communication ports or at least one of the plurality of communication types.

19. A system according to claim 18 wherein the processor is configured and arranged to select an identifying number for each of the plurality of communication ports and each of the plurality of communication types.

20. A system according to claim 18, wherein the processor comprises a portion of the network controller.

21. A computer readable medium encoded with computer executable instructions for performing a method of determining a communication identifier for use in a communication network having a predetermined communication protocol, the method comprising:
   determining a communication port number corresponding to a particular communication port;
   determining a communication type corresponding to the communications port; and
   selecting an identifying number for use as the communication identifier that corresponds to the communication port number and to the communication type, the identifying number being selected from a preset group of identifying numbers in which particular bits of each identifying number correspond to a group of preselected communication ports and further particular bits of each identifying number correspond to a group of preselected communication types.

* * * * *